April 2, 1968     R. S. BOWSER ET AL     3,376,177
PROCESS FOR THE MANUFACTURE OF ELECTROLUMINESCENT LAMPS
Filed May 4, 1964
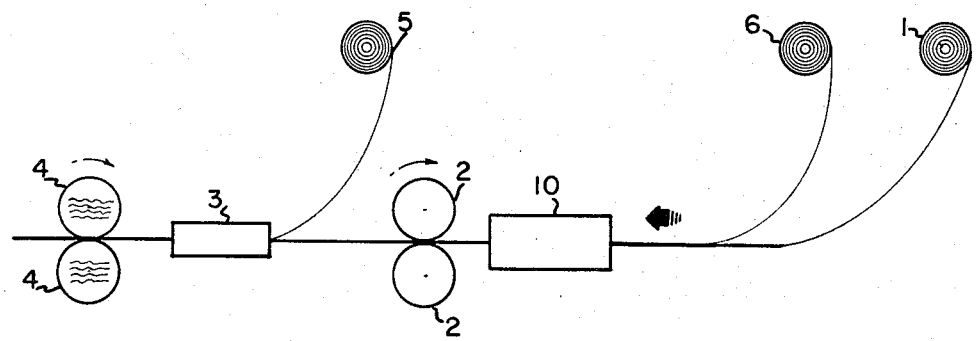
ROBERT S. BOWSER
THOMAS J. SENTEMENTES
INVENTORS
ATTORNEY

United States Patent Office 3,376,177
Patented Apr. 2, 1968

3,376,177
PROCESS FOR THE MANUFACTURE OF
ELECTROLUMINESCENT LAMPS
Robert S. Bowser and Thomas J. Sentementes, Wakefield, Mass., assignors to Sylvania Electric Products Inc., a corporation of Delaware
Filed May 4, 1964, Ser. No. 364,632
5 Claims. (Cl. 156—67)

This invention relates to the manufacture of flexible electroluminescent lamps and particularly to a method of disposing a transparent, electrically conductive glass paper upon a phosphor to form an electrode.

Flexible electroluminescent lamps are laminated structures which are generally formed upon a metal foil base electrode of aluminum. Coated upon the foil is a layer of dielectric, such as barium titanate dispersed in a resinous organic media such as cyanoethylcellulose. Above the dielectric is a layer of phosphor such as copper activated zinc sulfide dispersed in a similar media. A sheet of glass paper impregnated with an electrically conductive oxide is disposed upon the phosphor layer and integrally bonded to the dispersing media. A sheet of low melting plastic such as polyamide resins, particularly nylon or resins derived from polyamide is disposed upon the glass paper and bonded to the laminated structure. When heated, the plastic flows through the interstices of the glass paper and binds to the subjacent phosphor layer. An envelope having a low moisture vapor transmission rate is formed by sealing a sheet of plastic beneath the aluminum foil and another above the plastic-impregnated glass paper. The plastic can be, for example, polymeric monochlorotrifluoroethylene or dichlorodifluoroethylene.

In the prior art, it was difficult to place the conductive glass paper upon the phosphor-dielectric layers continuously. Because of the extreme fragility of the paper, which is less than 0.001 inch thick, it would crack, break and tear when unwound from rolls or handled. For these reasons, flexible electroluminescent lamps were limited to rather small cells which could be laid up individually. Generally, the maximum size was about 6 inches to one foot square.

We have discovered a method for preparing the electroluminescent lamps continuously, that is in the form of a belt of almost unlimited length. Our process eliminates the problem of torn or cracked glass paper.

In one embodiment, we align the glass paper over the previously described phosphor coated-strip of aluminum. The assembly is passed through rollers and the glass is physically crushed into the surface of the phosphor layer. Inherently the surface of the phosphor layer is rather craggy and the crushed paper covers it. When crushed, the paper (and hence the impregnated conductive material) is somewhat discontinuous and of high electrical resistance. A sheet of low melting plastic is bonded to the dielectric, through the paper to restore the continuity and give the lamp durability and strength.

In another embodiment, a sheet of electrically conductive glass paper is laid upon a sheet of low-melting plastic and passed through heated rollers so that the softened plastic flows into the interstices of the fibers. The phosphor-coated aluminum sheet and the embedded glass paper are then aligned and passed through heated rollers so that the glass paper is crushed into the phosphor layer and the plastic resoftened and bonded to the coating on the aluminum.

A major advantage of our process is that if the glass paper ever breaks during lamp or component fabrication, an electrical connection can be remade easily. If the break accurs, the broken ends need only to be overlapped and passed through the rollers. The overlaid top layer of glass paper will not adhere to the phosphor-plastic layer and can be easily dusted off. An electrical connection as good as unbroken paper is remade.

Accordingly, the primary object of our invention is the continuous production of flexible electroluminescent lamps.

The many other objects, features and advantages of the present invention will become manifest to those conversant with the art, upon making reference to the detailed description which follows and the accompanying drawings in which preferred procedural embodiments of methods of fabricating flexible, continuous, electroluminescent lamps are shown and described and wherein the principles of the present invention are incorporated by way of illustrative examples.

Of the drawings, the figure is a schematic view of equipment which can be used to manufacture continuous electroluminescent lamps.

Referring now to the drawings, a sheet of phosphor coated aluminum foil is unwound from roll 1. Simultaneously, a sheet of glass paper which has been impregnated with a light transmitting electrically conductive material such as indium or tin oxide is unwrapped from a roll 6. After alignment in jig 10, if desired, the two sheets are passed between a pair of rubber rollers 2. Such passage crushes the glass paper into the phosphor coating and causes it to adhere. Even though the phosphor surface has a very rough texture, the crushed paper fills all of the voids.

This method of forming the conductive strip needs a plastic impregnation to make a lamp. Such impregnation causes the paper to adhere to the phosphor premanently and align the crushed fibers to make them highly conductive. A layer of nylon is applied by rolling the aluminum-phosphor glass fiber sheet through heated rollers 4 simultaneously with a sheet of nylon from a roll 5 after passing the two through an alignment jig 3, if desired. The heat from the rollers 4 causes the nylon to become fluid and flow into the interstices of the glass fibers and attach the paper to the phosphor layer permanently. Passing the two sheets through the heated rollers simultaneously also drives out any occluded water which would be detrimental to the phosphor and lamp maintenance.

In another embodiment of the invention (not shown) a laminate of plastic and glass fiber is assembled by passing the glass paper simultaneously through heated rollers to form a reinforced structure. The reinforced laminate is then passed simultaneously through heated rollers with a sheet of phosphor-coated aluminum to form a continuous lamp.

Following either embodiment, a sheet of plastic is heat sealed to the bottom of the lamp and another to the top to form a hermetically sealed envelope.

If the glass paper breaks during the lamination process, the break is easily cured by overlapping one broken end over the other and passing the two simultaneously through the rollers for crushing. The overlapping glass will not adhere to the paper upon which it is disposed and can be easily dusted off. The glass fibers will fit together at the edges of the break and reform an electrical connection.

In the fabrication of a flexible electroluminescent lamp, a 0.001 to 0.01 inch sheet of aluminum is coated with a 0.05 to 0.002 inch dielectric coating of barium titanate suspended by cyanethylcellulose. Generally the suspension contains 10 to 50% barium titanate by weight. The coated sheet is then dried. Following, the aluminum sheet is coated with a suspension of copper activated, zinc sulfide, about 0.0005 to 0.003 inch thick and dried. Glass paper is rendered electrically conductive by passing it through a solution of stannous chloride or indium trifluoroacetate and then through an oven under oxidizing conditions to form the corresponding oxide.

The impregnated glass paper and coated aluminum sheet are then simultaneously passed through a pair of rubber rollers to crush the paper onto the phosphor coated and around the individual protruding phosphor particles. A single laminated sheet is then formed.

A low-melting plastic (less than 300° F.) nylon is then disposed over the crushed glass fiber with a narrow copper foil strip interposed between for a lead-in-wire. The two sheets are passed through heated rollers and the plastic allowed to flow into the interstices of the glass paper and onto the phosphor layer to adhere.

At the same time as the nylon lamination or subsequently, as desired, an envelope of polymeric monochlorotrifluoroethylene or dichlorodifluoroethylene is sealed on either side of the lamp for the prevention of humidity penetration. A lead-in wire is attached to the aluminum foil base to make the lamp.

In another embodiment, a sheet of electrically conductive paper is formed similarly as described above. The impregnated paper is laid upon a nylon sheet and heated so that the glass fibers merge with the softened plastic. The reinforced glass paper and a sheet of phosphor coated aluminum such as described previously is then rolled through a pair of heated rollers and crushed into the phosphor layer. Passage through the heated rollers causes the nylon to become fluid again and join with the plastic suspending the phosphor. A copper ribbon is disposed between the nylon and the glass paper similarly as described above. When the cell is made, it is laminated between a pair of plastic sheets such as described above to form a continuous lamp.

It is apparent that modifications and changes can be made within the spirit and scope of the instant invention but it is our intention, however, only to be limited by the appended claims.

As our invention we claim:

1. A method of fabricating continuous electroluminescent lamps, the steps which comprise: placing an electrically conductive sheet of glass paper over a sheet of metal foil coated with a particulate layer of phosphor dispersed in a resinous organic media; passing said glass sheet and said coated metal foil through a roller thereby bonding said glass paper to said phosphor layer.

2. The method according to claim 1 wherein a sheet of low melting plastic is placed over the glass paper after it has been passed through the roller and bonded to the phosphor; passing the assembly through a heated roller to heat the plastic and soften it, whereby the plastic flows through the interstices of the glass paper and attaches to the organic dispersing media.

3. The process according to claim 2 wherein the glass is crushed into the phosphor layer by passing directly under said roller.

4. The process according to claim 1 wherein the electrically conductive glass paper is placed upon the sheet of low melting resinous plastic and the two are passed through heated rollers to embed the glass in the plastic and then passing embedded glass sheet and the sheet of phosphor coated foil through said first mentioned heated rollers, thereby resoftening the plastic and allowing it to flow through the glass paper and attach to the organic dispersing media.

5. The process according to claim 4 wherein the glass is crushed into the phosphor layer by passing the embedded plastic sheet directly under the roller.

References Cited

UNITED STATES PATENTS

| | | | |
|---|---|---|---|
| 1,726,343 | 8/1929 | Danziger | 156—324 |
| 2,068,893 | 1/1937 | Stuart | 156—555 |
| 2,818,904 | 1/1958 | Ambrose | 156—555 |
| 2,945,976 | 7/1960 | Fridrich | 313—108.1 |
| 3,177,391 | 4/1965 | Devol et al. | 156—67 |
| 3,226,272 | 12/1965 | Longfellow | 156—67 |
| 3,253,173 | 5/1966 | Levetan | 156—67 |

DOUGLAS J. DRUMMOND, *Primary Examiner.*